(12) United States Patent
Heo et al.

(10) Patent No.: US 12,504,841 B2
(45) Date of Patent: Dec. 23, 2025

(54) LIGHT EMITTING DISPLAY DEVICE

(71) Applicant: LG Display Co., Ltd., Seoul (KR)

(72) Inventors: Jun Heo, Paju-si (KR); Su-Bin Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 47 days.

(21) Appl. No.: 18/426,047

(22) Filed: Jan. 29, 2024

(65) Prior Publication Data

US 2024/0256072 A1 Aug. 1, 2024

(30) Foreign Application Priority Data

Jan. 30, 2023 (KR) .................. 10-2023-0011627

(51) Int. Cl.
*G06F 3/041* (2006.01)
*G01L 1/22* (2006.01)
*G09G 3/32* (2016.01)

(52) U.S. Cl.
CPC .......... *G06F 3/0414* (2013.01); *G01L 1/2287* (2013.01); *G09G 3/32* (2013.01); *G06F 3/0412* (2013.01); *G06F 2203/04102* (2013.01); *G09G 2300/0861* (2013.01); *G09G 2320/0673* (2013.01); *G09G 2330/021* (2013.01)

(58) Field of Classification Search
CPC ............... G06F 3/0412; G06F 3/0414; G06F 2203/04102; G09G 3/32; G09G 2300/0861; G09G 2320/0673; G09G 2330/021; G01L 1/2287

See application file for complete search history.

(56) References Cited

U.S. PATENT DOCUMENTS

| | | | | |
|---|---|---|---|---|
| 11,282,424 | B2 * | 3/2022 | Shang | ........................ G06F 3/03 |
| 2011/0141052 | A1 * | 6/2011 | Bernstein | ................ G06F 3/041 |
| | | | | 341/5 |
| 2017/0003811 | A1 * | 1/2017 | Lu | ........................ G06F 3/04144 |
| 2018/0300012 | A1 * | 10/2018 | Lu | ........................... H10D 86/60 |
| 2018/0356912 | A1 * | 12/2018 | Yamaguchi | ............... G06F 3/03 |
| 2021/0223871 | A1 * | 7/2021 | Shang | ........................ G09G 3/20 |
| 2021/0263630 | A1 * | 8/2021 | Kim | ................... G06F 3/04142 |
| 2022/0074799 | A1 * | 3/2022 | Li | ............................. G01L 5/22 |
| 2022/0077275 | A1 * | 3/2022 | Jo | ........................... G09G 3/035 |
| 2022/0147179 | A1 * | 5/2022 | Kim | ..................... G06F 1/1677 |

FOREIGN PATENT DOCUMENTS

KR 20220031289 A 3/2022

\* cited by examiner

*Primary Examiner* — Ke Xiao
*Assistant Examiner* — Jennifer L Zubajlo
(74) *Attorney, Agent, or Firm* — Seed Intellectual Property Law Group LLP

(57) ABSTRACT

A light emitting display device includes a display panel. The display panel includes a display region where pixels are arranged, a non-display region outside the display region, and a folding region extending along a direction. The display device includes a strain sensor located in the folding region in the non-display region and having a Wheatstone bridge circuit structure. The display device includes a gamma reference voltage portion providing an input voltage to the strain sensor. The display device includes a power supply portion providing a reference voltage to the gamma reference voltage portion. The display device includes a controller receiving an output voltage of the strain sensor.

22 Claims, 7 Drawing Sheets

LIGHT EMITTING DISPLAY DEVICE

CROSS REFERENCE TO RELATED APPLICATIONS

The present application claims the priority benefit of Korean Patent Application No. 10-2023-0011627 filed in Republic of Korea on Jan. 30, 2023, which is hereby incorporated by reference in its entirety for all purposes as if fully set forth herein.

BACKGROUND

Technical Field

The present disclosure relates to a light emitting display device.

Description of the Related Art

As the information society develops, a demand for display devices for displaying images have increased in various forms, and in recent years, various flat display devices such as light emitting display devices and liquid crystal display devices have been used.

Among these flat display devices, the light emitting display device equipped with a light emitting diode, which is a self-luminescent element, has been widely used recently.

Meanwhile, as foldable smartphones, etc., become widely available, research and development on foldable light emitting display devices are being actively conducted.

The foldable light emitting display device continues to fold during use, causing a folded portion to be morphologically deformed.

BRIEF SUMMARY

The inventors of the present disclosure have recognized that currently there is no established structure or method for detecting a strain in the folded portion of the foldable light emitting display device. Further, the inventors have appreciated that many of the solutions provided in the related art remains at a level of measuring the strain by simply connecting an expensive strain measurement equipment to a test product.

An advantage of the present disclosure is to provide a light emitting display device that can provide new structure and method configured to measuring a strain according to folding of a foldable light emitting display device.

Additional features and advantages of the disclosure will be set forth in the description which follows, and in part will be apparent from the description, or may be learned by practice of the disclosure. These and other advantages of the disclosure will be realized and attained by the structure particularly pointed out in the written description and claims hereof as well as the appended drawings.

To achieve these and other advantages and in accordance with the purpose of the present disclosure, as embodied and broadly described herein, a light emitting display device includes: a display panel including a display region where pixels are arranged, a non-display region outside the display region, and a folding region extending along a direction; a strain sensor located in the folding region in the non-display region and having a Wheatstone bridge circuit structure; a gamma reference voltage portion providing an input voltage to the strain sensor; a power supply portion providing a reference voltage to the gamma reference voltage portion; and a controller receiving an output voltage of the strain sensor.

In another aspect, a light emitting display device includes: a display panel including a folding region extending along a direction; a strain sensor located in a portion of the folding region and having a Wheatstone bridge circuit structure; a gamma reference voltage portion receiving a reference voltage and providing an input voltage to the strain sensor; and a controller receiving an output voltage of the strain sensor.

In yet another aspect, an electronic device includes: a display panel including a display region where pixels are arranged, a non-display region outside the display region, and a folding region extending along a direction; a strain sensor located in the folding region located in the non-display region and having a Wheatstone bridge circuit structure; a gamma reference voltage portion providing an input voltage to the strain sensor; a power supply portion providing a reference voltage to the gamma reference voltage portion; a controller receiving an output voltage of the strain sensor; and a host system receiving the output voltage from the controller and calculating a corresponding strain.

It is to be understood that both the foregoing general description and the following detailed description are exemplary and explanatory and are intended to provide further explanation of the disclosure as claimed.

BRIEF DESCRIPTION OF THE SEVERAL VIEWS OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION

Figure 1:
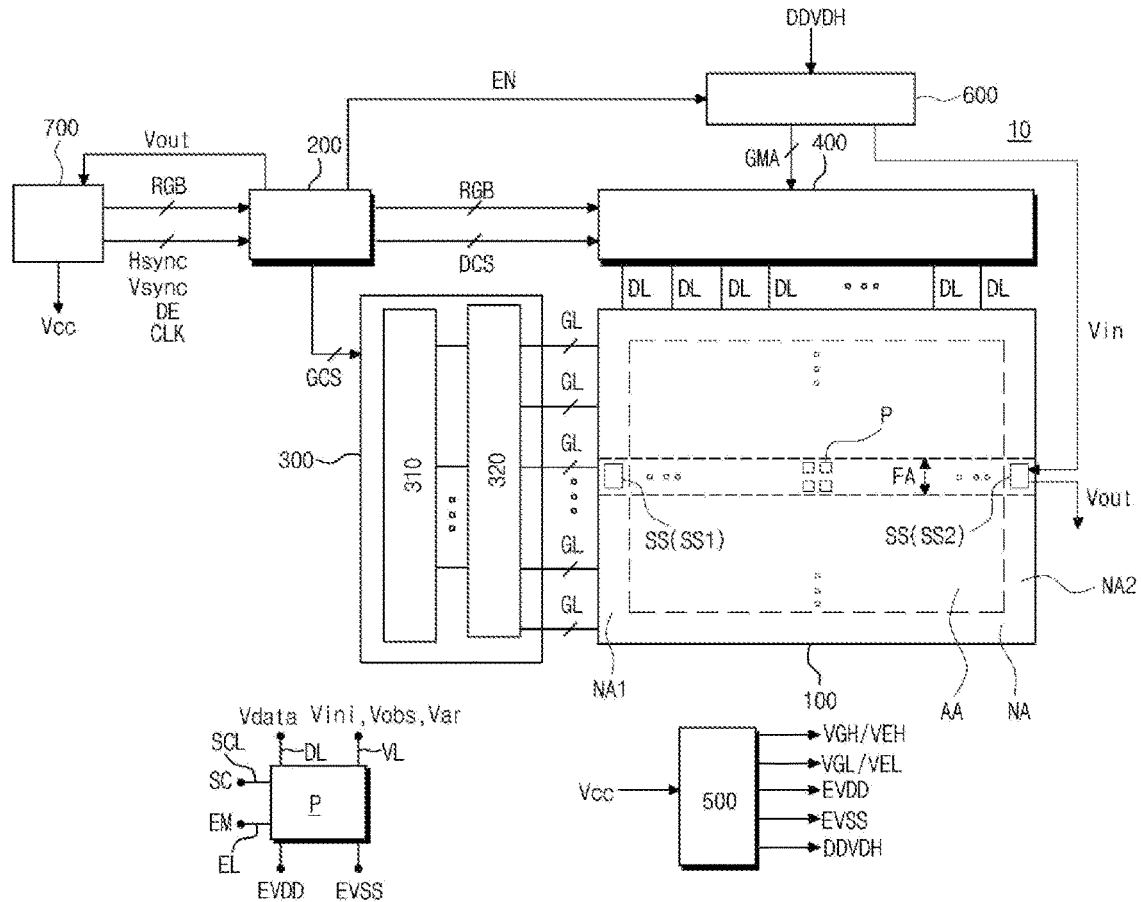
FIG. 1 is a view schematically illustrating a light emitting display device according to an embodiment of the present disclosure.

Advantages and features of the present disclosure and methods of achieving them will be apparent with reference to the embodiments described below in detail with the accompanying drawings. However, the present disclosure is not limited to the embodiments disclosed below, but can be realized in a variety of different forms, and only these embodiments allow the present disclosure to be complete. The present disclosure is provided to fully inform the scope of the disclosure to the skilled in the art of the present disclosure, and the present disclosure may be defined by the scope of the claims.

The shapes, sizes, proportions, angles, numbers, and the like disclosed in the drawings for explaining the embodiments of the present disclosure are illustrative, and the present disclosure is not limited to the illustrated matters. The same reference numerals refer to the same components throughout the description.

Furthermore, in describing the present disclosure, if it is determined that a detailed description of the related known technology unnecessarily obscure the subject matter of the present disclosure, the detailed description thereof can be omitted. When 'comprising,' 'including,' 'having,' 'consisting,' and the like are used in this disclosure, other parts can be added unless 'only' is used. When a component is expressed in the singular, cases including the plural are included unless specific statement is described.

In interpreting the components, even if there is no separate explicit description, it is interpreted as including a margin range.

In the case of a description of a positional relationship, for example, when the positional relationship of two parts is described as 'on,' 'over,' 'above,' 'below,' 'beside,' 'under,' and the like, one or more other parts can be positioned between such two parts unless 'right' or 'directly' is used.

In the case of a description of a temporal relationship, for example, when a temporal precedence is described as 'after,' 'following,' 'before,' and the like, cases that are not continuous can be included unless 'directly' or 'immediately' is used.

In describing components of the present disclosure, terms such as first, second and the like can be used. These terms are only for distinguishing the components from other components, and an essence, order, or number of the components is not limited by the terms.

Respective features of various embodiments of the present disclosure can be partially or wholly connected to or combined with each other and can be technically interlocked and driven variously, and respective embodiments can be independently implemented from each other or can be implemented together with a related relationship.

Hereinafter, embodiments of the present disclosure are described in detail with reference to the drawings. Meanwhile, in the following embodiments, the same and like reference numerals are assigned to the same and like components, and detailed descriptions thereof may be omitted.

Figure 2:
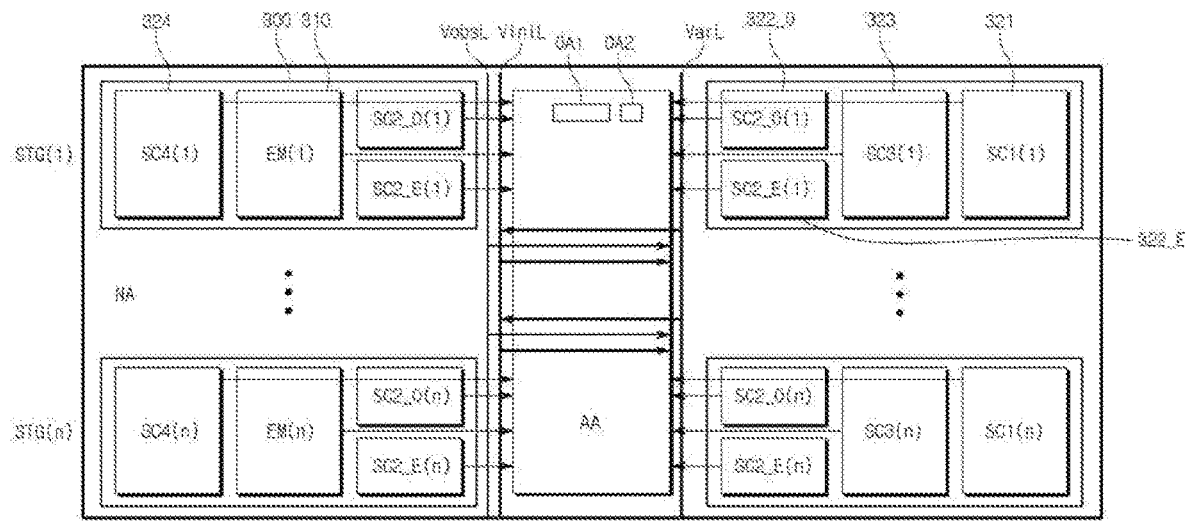
FIG. 2 is a view illustrating a configuration of a gate driving portion of a light emitting display device according to an embodiment of the present disclosure.
Figure 3:
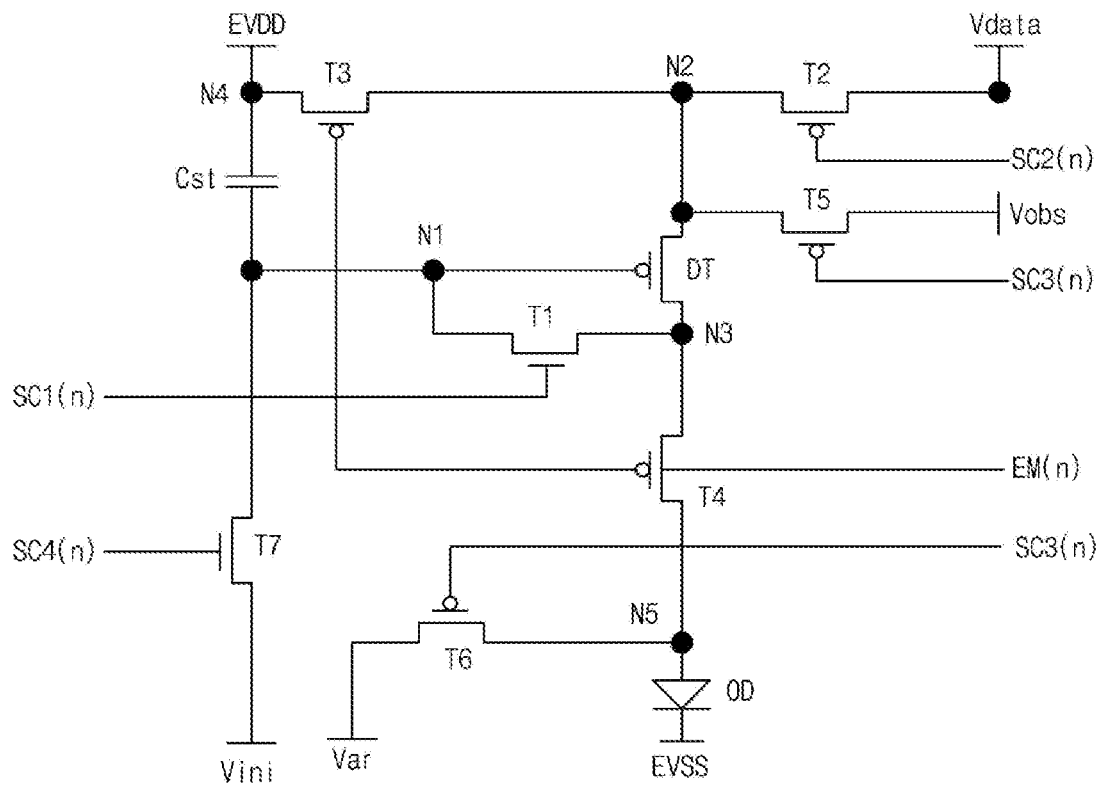
FIG. 3 is a circuit diagram schematically illustrating an example of a pixel according to an embodiment of the present disclosure.
Figure 4:
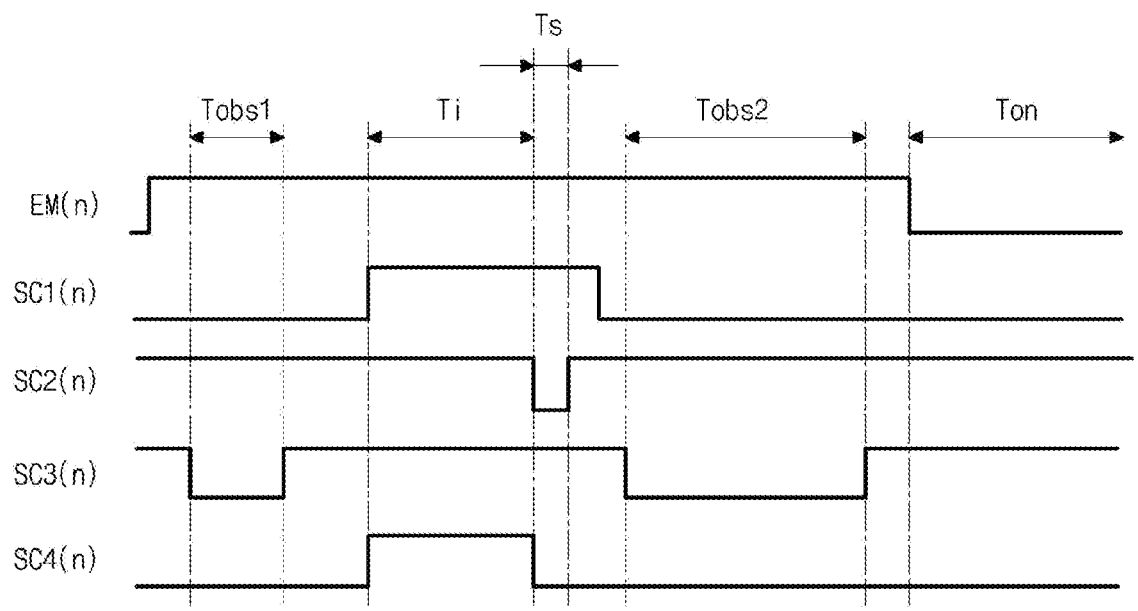
FIG. 4 is a timing diagram schematically illustrating an example of driving signals that drive a pixel of FIG. 3.

FIG. 1 is a view schematically illustrating a light emitting display device according to an embodiment of the present disclosure. FIG. 2 is a view illustrating a configuration of a gate driving portion of a light emitting display device according to an embodiment of the present disclosure. FIG. 3 is a circuit diagram schematically illustrating an example of a pixel according to an embodiment of the present disclosure. FIG. 4 is a timing diagram schematically illustrating an example of driving signals that drive a pixel of FIG. 3.

Referring to FIGS. 1 and 2, the light emitting display device 10 according to this embodiment may be a foldable light emitting display device.

This light emitting display device 10 may include a flexible display panel 100 including a plurality of pixels P, a controller 200, a gate driving circuit 300 (also referred to as "a gate driving portion 300") that supplies a gate signal to each of the plurality of pixels P, a data driving circuit 400 (also referred to as "a data driving portion 400") that supplies a data signal to each of the plurality of pixels P, and a power supply circuit 500 (also referred to as "a power supply portion 500") that supplies power for driving each of the plurality of pixels P. The term "portion" used herein may include any electrical circuitry, features, components, an assembly of electronic components or the like.

The display panel 100 may include a display region AA where the pixels P are located and the non-display region NA surrounding the display region AA. For example, the gate driving portion 300 may be disposed in the non-display region NA, but not limited thereto.

In this display panel 100, a folding region FA where folding occurs may be defined. The display panel 100 can use a direction in which the folding region FA extends as a folding axis, and can be folded so that display surfaces (or front surfaces) face each other, or opposite surfaces (or rear surfaces) of the display surfaces face each other.

The folding region FA may be formed to cross the display region AA (and the non-display region NA) or to cross the non-display region NA.

In this embodiment, an example is taken where the folding region FA extends in one direction, for example, a horizontal direction (or row direction or first direction) in the drawing, and is formed across the display region AA.

In this case, the folding region FA may also be located in first and second non-display regions NA1 and NA2 which are portions of the non-display region NA disposed on both sides of the display region AA. In this case, in the folding region FA located in at least one of the first and second non-display regions NA1 and NA2, a strain sensor SS may be formed which is a sensor for measuring a physical strain (or measuring a degree of strain) of the folded portion of the display panel 100 when the display panel 100 is folded. In this embodiment, a case in which a strain sensor SS is provided in each of the first and second non-display regions NA1 and NA2 is taken as an example. When the strain sensors SS are provided on both sides of the display panel 100, the strain can be measured more accurately.

The strain sensor SS may be configured as a sensor with a Wheatstone bridge circuit structure using resistors, and may be used to detect the strain when the display panel 100 is folded. A detailed description of the structure and method of detecting the strain of the display panel 100 through the strain sensor SS is later.

In the display panel 100, a plurality of gate lines GL and a plurality of data lines DL may cross each other, and each of the plurality of pixels P may connected to the corresponding gate line GL and data line DL. Specifically, one pixel P may receive the gate signal from the gate driving portion 300 through the gate line GL, the data signal from the data driving portion 400 through the data line DL, and a high-potential driving voltage EVDD and a low-potential driving voltage EVSS from the power supply portion 500.

Here, the gate line GL may supply a scan signal SC and an emission control signal EM, and the data line DL may supply a data voltage Vdata. In addition, according to various embodiments, the gate line GL may include a plurality of scan lines SCL that supply the scan signals SC and an emission control line EL that supplies the emission control signal EM. In addition, the plurality of pixels P may further include power lines VL to receive a bias voltage Vobs and initialization voltages Var and Vini.

In addition, each pixel P may include the light emitting diode (or light emitting element) OD and a pixel circuit that controls a driving of the light emitting diode OD, as shown in FIG. 3.

The pixel circuit may include a plurality of switching elements, a driving element, and a capacitor. Here, the switching elements and driving element may be formed of thin film transistors. In the pixel circuit, the driving element may control an amount of current supplied to the light emitting diode OD according to the data voltage Vdata to adjust an amount of emission of the light emitting diode OD. In addition, the plurality of switching elements may operate the pixel circuit by receiving the scan signals SC supplied through the plurality of scan lines SCL and the emission control signal EM supplied through the emission control line EL.

The display panel 100 may be configured as a non-transmissive display panel or a transmissive display panel. A transmissive display panel may be applied to a transparent display device where an image is displayed on a screen and an actual object in a background is visible.

The pixels P may be divided into a red pixel, a green pixel, and a blue pixel to implement a full color. The pixels P may further include a white pixel. Each of the pixels P includes the pixel circuit as above.

Touch sensors may be disposed on the display panel 100. A touch input may be sensed using separate touch sensors or may be sensed through the pixels P. The touch sensors may be placed on the screen of the display panel 100 as an on-cell type sensors or add-on type sensors, or may be implemented as in-cell type sensors built into the display panel 100.

The controller 200 may process image data RGB input from a host system 700 outside the light emitting display device 10 to suit size and resolution of the display panel 100 and supply them to the data driving portion 400. The controller 200 may use synchronization signals input from the outside, for example, a dot clock signal CLK, a data enable signal DE, a horizontal synchronization signal Hsync, and a vertical synchronization signal Vsync to generate a gate control signal GCS and a data control signal DCS. The controller 200 may supply the generated gate control signal GCS and data control signal DCS to the gate driving portion 300 and the data driving portion 400, respectively, to control the gate driving portion 300 and the data driving portion 400.

The controller 200 may be configured by being combined with various processors, for example, a microprocessor, a mobile processor, an application processor, etc., depending on a device on which it is mounted.

The host system 700 may be, for example, a driving system that drives an electronic device to which the foldable light emitting display device 10 of this embodiment is applied. Such the electronic device may be, for example, any one of TV (Television), navigation, monitor, mobile device, and wearable device.

A voltage level of the gate control signal GCS output from the controller 200 may be converted into a gate-on voltage (or on-voltage) VGL or VEL and a gate-off voltage (or off-voltage) VGH or VEH through a level shifter (not shown) and then be supplied to the gate driving portion 300. The level shifter may convert a low level voltage of the gate control signal GCS into the gate low voltage VGL, and convert a high level voltage of the gate control signal GCS into the gate high voltage VGH. The gate control signal GCS may include a start pulse and a shift clock.

The gate driving portion 300 may supply the scan signal SC to the gate line GL according to the gate control signal GCS from the controller 200. The gate driving portion 300 may be disposed in the non-display region NA on one or both sides of the display panel 100 in a gate in panel (GIP) structure.

The gate driving portion 300 may sequentially output the gate signals to the plurality of gate lines GL under the control of the controller 200. The gate driving portion 300 may sequentially supply the gate signals to the gate lines GL by shifting the gate signal using a shift register.

The gate signal may include the scan signal SC and the emission control signal EM in the light emitting display device 10. The scan signal SC may include a scan pulse that swings between the gate-on voltage VGL and the gate-off voltage VGH. The emission control signal EM may include an emission control signal pulse that swings between the gate-on voltage VEL and the gate-off voltage VEH.

The scan pulse may be synchronized with the data voltage Vdata and select the pixels P of a line where data are written. The emission control signal EM may define an emission time of the pixels P.

The gate driving portion 300 may include an emission control signal driving portion 310 and at least one scan driving portion 320.

The emission control signal driving portion 310 may output an emission control signal pulse in response to a start pulse and a shift clock from the controller 200, and may sequentially shift the emission control signal pulse according to the shift clock.

At least one scan driving portion 320 may output a scan pulse in response to a start pulse and a shift clock from the controller 200, and may shift the scan pulse according to the shift clock timing.

Hereinafter, the gate driving portion 300 of this embodiment is described in more detail with further reference to FIG. 2.

The scan driving portion 320 may be configured with first to fourth scan driving portions 321, 322, 323, and 324. In addition, the second scan driving portion 322 may be configured with an odd second scan driving portion 322_O and an even second scan driving portion 322_E.

The gate driving portion 300 may have shift registers configured symmetrically on both sides of the display region AA. In addition, the shift register on one side of the display region AA may be configured to include the second scan driving portion 322_O and 322_E, the fourth scan driving portion 324, and the emission control signal driving portion 310, and the shift register on the other side of the display region AA may be configured to include the first scan driving portion 321, the second scan driving portion 322_O and 322_E, and the third scan driving portion 323. However, the configuration of the gate driving portion 300 is not limited to this, and the emission control signal driving portion 310 and the first to fourth scan driving portions 321, 322, 323, and 324 may be arranged differently according to embodiments.

Stages STG(1) to STG(n) of the shift register may include first scan signal generators SC1(1) to SC1(n), second scan signal generators SC2_O(1) to SC2_O(n) and SC2_E(1) to SC2_E(n), third scan signal generators SC3(1) to SC3(n), fourth scan signal generators SC4(1) to SC4(n), and emission control signal generators EM(1) to EM(n), respectively.

The first scan signal generators SC1(1) to SC1(n) may output the first scan signals SC1(1) to SC1(n) through the first scan lines of the display panel 100. The second scan signal generators SC2(1) to SC2(n) may output the second scan signals SC2(1) to SC2(n) through the second scan lines of the display panel 100. The third scan signal generators SC3(1) to SC3(n) may output the third scan signals SC3(1) to SC3(n) through the third scan lines of the display panel 100. The fourth scan signal generators SC4(1) to SC4(n) may output the fourth scan signals SC4(1) to SC4(n) through the fourth scan lines of the display panel 100. The emission control signal generators EM(1) to EM(n) may output the emission control signals EM(1) to EM(n) through the emission control lines EL of the display panel 100.

The first scan signals SC1(1) to SC1(n) may each be used as a signal to drive a A transistor (e.g., a compensation transistor, etc.) included in the pixel circuit. The second scan signals SC2(1) to SC2(n) may each be used as a signal to drive a B transistor (e.g., a data supply transistor, etc.) included in the pixel circuit. The third scan signals SC3(1) to SC3(n) may each be used as a signal to drive a C transistor (e.g., a bias transistor, etc.) included in the pixel circuit. The fourth scan signals SC4(1) to SC4(n) may each be used as a signal to drive a D transistor (e.g., an initialization transistor, etc.) included in the pixel circuit. The emission control signals EM(1) to EM(n) may each be used as a signal to drive a E transistor (e.g., an emission control transistor, etc.) included in the pixel circuit. For example, when the emission control transistor of the pixel is controlled using the corresponding one of the emission control signals EM(1) to EM(n), the emission time of the light emitting element may be varied.

Referring to FIG. 2, a bias voltage bus line VobsL, a first initialization voltage bus line VarL, and a second initialization voltage bus line ViniL may be disposed between the gate driving portion 300 and the display region AA.

The bias voltage bus line VobsL, the first initialization voltage bus line VarL, and the second initialization voltage bus line ViniL may respectively supply the bias voltage Vobs, the first initialization voltage Var, and the second initialization voltage Vini to the pixel circuit from the power supply portion 500.

In the drawing, each of the bias voltage bus line VobsL, the first initialization voltage bus line VarL, and the second initialization voltage bus line ViniL are shown as being located only on one side, i.e., the left or right side of the display region AA, but not limited thereto, and may be located on both sides, and even if located on one side, the location is not limited to the left or right.

Referring to FIG. 2, one or more optical regions OA1 and OA2 may be disposed in the display region AA.

One or more optical regions OA1 and OA2 may be arranged to overlap one or more optical electronic device, for example, a photographing device such as a camera (or image sensor), and/or a detection sensor such as a proximity sensor or an illuminance sensor. For the operation of the optical electronic device, one or more optical regions OA1 and OA2 may have a light transmittance structure formed therein and have transmittance above a certain level. In other words, a number of pixels P per unit area in one or more optical regions OA1 and OA2 may be smaller than a number of pixels P per unit area in a general region excluding the optical regions OA1 and OA2 in the display region AA. That is, a resolution of one or more optical regions OA1 and OA2 may be lower than a resolution of the general region in the display region AA.

Referring again to FIG. 1, the data driving portion 400 may convert the image data RGB into the data voltages Vdata according to the data control signal DCS supplied from the controller 200, and supply the converted data voltages Vdata to the corresponding pixels P through the data lines DL.

In FIG. 1, the data driving portion 400 is shown as being arranged in a single form on one side of the display panel 100, but number and position of the data driving portion 400 are not limited thereto.

In other words, the data driving portion 400 may be formed of a plurality of integrated circuits (ICs) and may be arranged to be divided into a plurality of units on one side of the display panel 100.

The power supply portion 500 may use a DC-DC converter to generate direct current (DC) power necessary to drive the pixel array of the display panel 100 and a driving portion of the display panel 100. The DC-DC converter may include a charge pump, a regulator, a buck converter, a boost converter, etc. The power supply portion 500 may receive a power voltage Vcc as a driving voltage, for driving the light emitting display device 10, from a host system 700, and generate DC voltages such as the gate-on voltages VGL and VEL, the gate-off voltages VGH and VEH, the high-potential driving voltage EVDD, and the low-potential driving voltage EVSS. The gate-on voltages VGL and VEL and the gate-off voltages VGH and VEH may be supplied to a level shifter (not shown) and the gate driving portion 300. The high-potential driving voltage EVDD and the low-potential driving voltage EVSS may be commonly supplied to the pixels P.

Moreover, the power supply portion 500 may generate, for example, a reference voltage (DDVDH) supplied to a gamma reference voltage circuit 600 (also referred to as "a gamma reference voltage portion 600").

The gamma reference voltage portion 600 may receive the reference voltage DDVDH output from the power supply portion 500 and use it to generate a plurality of gamma reference voltages GMA.

The gamma reference voltages GMA may be provided to the data driving portion 400, and the data driving portion 400 may use the gamma reference voltages GMA to generate the data voltage Vdata corresponding to the image data RGB and output the data voltage Vdata to the data line DL.

Referring to FIG. 3, the pixel circuit in the pixel P is described.

FIG. 3 shows a pixel circuit as an example for explanation, and a pixel circuit is not limited as long as its structure can receive the emission control signal EM(n) and control emission of the light emitting diode OD. For example, the pixel circuit may include an additional scan signal and a switching thin film transistor receiving the additional scan signal, and a switching thin film transistor to which an additional initialization voltage is applied, and a connection relationship of the switching element and a connection position of the capacitor may be made in various ways. Hereinafter, for convenience of explanation, the display device 10 having the pixel circuit structure of FIG. 3 is described.

Referring to FIG. 3, each of the plurality of pixels P may include a pixel circuit having a driving transistor DT and a light emitting diode OD connected to the pixel circuit.

The pixel circuit may control a driving current (or emission current) flowing to the light emitting diode OD to drive the light emitting diode OD. The pixel circuit may include the driving transistor DT, first to seventh transistors T1 to T7, and a capacitor Cst. Each of the transistors DT, and T1 to T7 may include a first electrode, a second electrode, and a gate electrode. One of the first electrode and the second electrode may be a source electrode, and the other of the first electrode and the second electrode may be a drain electrode.

Each of the transistors DT, and T1 to T7 may be a P-type thin film transistor or an N-type thin film transistor. In the embodiment of FIG. 3, the first transistor T1 and the seventh transistor T7 are N-type thin film transistors, and the remaining transistors DT, and T2 to T6 are P-type thin film transistors. However, the present disclosure is not limited thereto, and according to embodiments, all or part of the transistors DT, and T1 to T7 may be P-type thin film transistors or N-type thin film transistors. In addition, the N-type thin film transistor may be an oxide thin film transistor, and the P-type thin film transistor may be a polycrystalline silicon thin film transistor.

Hereinafter, the first transistor T1 and the seventh transistor T7 configured with N-type thin film transistors, and the remaining transistors DT, and T2 to T6 configured with P-type thin film transistors are explained by way of example. Accordingly, the first transistor T1 and the seventh transistor T7 are turned on by receiving a high voltage, and the remaining transistors DT, and T2 to T6 are turned on by receiving a low voltage.

According to one example, the first transistor T1 may serve as a compensation transistor, the second transistor T2 may serve as a data supply transistor, the third and fourth transistors T3 and T4 may serve as emission control transistors, and the fifth transistor T5 may serve as a bias transistor, and the sixth and seventh transistors T6 and T7 may serve as initialization transistors.

The light emitting diode OD may include an anode electrode and a cathode electrode. The anode electrode of the light emitting diode OD may be connected to a fifth node N5, and the cathode electrode of the light emitting diode OD may be connected to a line supplying the low-potential driving voltage EVSS.

The driving transistor DT may include a first electrode connected to a second node N2, a second electrode connected to a third node N3, and a gate electrode connected to a first node N1. The driving transistor DT may provide a driving current (Id) to the light emitting diode OD based on a voltage of the first node N1 (or a data voltage stored in the capacitor Cst as described later).

The first transistor T1 may include a first electrode connected to the first node N1, a second electrode connected to the third node N3, and a gate electrode that receives the first scan signal SC1(n). The first transistor T1 may be turned on in response to the first scan signal SC1(n), and form a diode connection between the first node N1 and the third node N3 to sample a threshold voltage (Vth) of the driving transistor DT. The first transistor T1 may be a compensation transistor.

The capacitor Cst may be connected between the first node N1 and a fourth node N4. The capacitor Cst may store or maintain the high-potential driving voltage EVDD provided thereto.

The second transistor T2 may include a first electrode connected to the data line DL (or receiving the data voltage Vdata), a second electrode connected to the second node N2, and a gate electrode that receives the second scan signal SC2(n). The second transistor T2 may be turned on in response to the second scan signal SC2(n) and transmit the data voltage Vdata to the second node N2. The second transistor T2 may be a data supply transistor.

The third transistor T3 and the fourth transistor T4 (or first and second emission control transistors) may be connected between a line supplying the high-potential driving voltage EVDD and the light emitting diode OD, and form a current movement path through which the driving current (Id) generated by the driving transistor DT moves.

The third transistor T3 may include a first electrode connected to a fourth node N4 to receive the high-potential driving voltage EVDD, a second electrode connected to the second node N2, and a gate electrode that receives the emission control signal EM(n).

The fourth transistor T4 may include a first electrode connected to the third node N3, a second electrode connected to a fifth node N5 (or the anode electrode of the light emitting diode OD), and a gate electrode that receives the emission control signal EM(n).

The third and fourth transistors T3 and T4 may be turned on in response to the emission control signal EM(n), and in this case, the driving current (Id) may be provided to the light emitting diode OD, and the light emitting diode OD may emit light with luminance corresponding to the driving current (Id).

The fifth transistor T5 may include a first electrode receiving the bias voltage Vobs, a second electrode connected to the second node N2, and a gate electrode receiving the third scan signal SC3(n). The fifth transistor T5 may be a bias transistor.

The sixth transistor T6 may include a first electrode receiving the first initialization voltage Var, a second electrode connected to the fifth node N5, and a gate electrode receiving the third scan signal SC3(n).

The sixth transistor T6 may be turned on in response to the third scan signal SC3(n) before emission of the light emitting diode OD (or after emission of the light emitting diode OD), and may initialize the anode electrode of the light emitting diode OD using the first initialization voltage Var. In this regard, the light emitting diode OD may have a parasitic capacitor formed between the anode electrode and the cathode electrode. While the light emitting diode OD emits light, the parasitic capacitor may be charged so that the anode electrode of the light emitting diode OD may have a certain voltage. Accordingly, by applying the first initialization voltage Var to the anode electrode of the light emitting diode OD through the sixth transistor T6, an amount of charge accumulated in the light emitting diode OD can be initialized.

In this embodiment, the gate electrodes of the fifth and sixth transistors T5 and T6 may be configured to commonly receive the third scan signal SC3(n). However, the present disclosure is not necessarily limited to this, and the gate electrodes of the fifth and sixth transistors T5 and T6 may be configured to be independently controlled by receiving separate scan signals.

The seventh transistor T7 may include a first electrode receiving the second initialization voltage Vini, a second electrode connected to the first node N1, and a gate electrode receiving the fourth scan signal SC4(n).

The seventh transistor T7 may be turned on in response to the fourth scan signal SC4(n), and may initialize the gate electrode of the driving transistor DT using the second initialization voltage Vini. Unnecessary charges may remain in the gate electrode of the driving transistor DT due to the high-potential driving voltage EVDD stored in the capacitor Cst. Accordingly, by applying the second initialization voltage Vini to the gate electrode of the driving transistor DT through the seventh transistor T7, an amount of the remaining charges can be initialized.

The operation of the above pixel circuit and light emitting diode OD is described with further reference to FIG. 4.

In each frame, the pixel P may operate with at least one bias period Tobs1 and Tobs2, an initialization period Ti, a sampling period Ts, and an emission period Ton, but this is one embodiment and the present disclosure is not necessarily bound to this order.

At least one bias period Tobs1 and Tobs2 may be a period when an on-bias stress (OBS) operation with the bias voltage Vobs being applied is performed. In the bias period Tobs1 and Tobs2, the emission control signal EM(n) has a high voltage, and the third and fourth transistors T3 and T4 are turned off. The first scan signal SC1 (n) and the fourth scan signal SC4(n) have low voltages, and the first transistor T1 and the seventh transistor T7 are turned off. The second scan signal SC2 has a high voltage and the second transistor T2 is turned off.

The third scan signal SC3(n) is input as a low voltage, and the fifth and sixth transistors T5 and T6 are turned on. As the fifth transistor T5 is turned on, the bias voltage Vobs is applied to the first electrode of the driving transistor DT connected to the second node N2.

Here, the bias voltage Vobs is supplied to the third node N3 that is the drain electrode of the driving transistor DT, so that a charging time or charging delay of the voltage of the fifth node N5, which is the anode electrode of the light emitting diode OD, in the emission period Ton may be reduced. The driving transistor DT maintains a stronger saturation state.

For example, as the bias voltage Vobs increases, the voltage of the third node N3 that is the drain electrode of the driving transistor DT may increase, and the gate-source voltage or drain-source voltage of the driving transistor DT may decrease. Thus, it is preferable that the bias voltage Vobs is at least greater than the data voltage Vdata.

At this time, a magnitude of the drain-source current (Id) passing through the driving transistor DT may be reduced, and a stress of the driving transistor DT may be reduced in a positive bias stress situation, thereby resolving the charging delay of the voltage of the third node N3. In other words, performing the on-bias stress (OBS) operation before sampling the threshold voltage (Vth) of the driving transistor DT may alleviate a hysteresis of the driving transistor DT.

The initialization period Ti may be a period for initializing the voltage of the gate electrode of the driving transistor DT.

The first scan signal SC1(n) to the fourth scan signal SC4(n) and the emission control signal EM(n) have high voltages, and the first transistor T1 and the seventh transistor T7 are turned on. The second to sixth transistors T2 to T6 are turned off. As the first and seventh transistors T1 and T7 are turned on, the gate electrode and second electrode of the driving transistor DT connected to the first node N1 are initialized to the second initialization voltage Vini.

The sampling period Ts may be a period that samples the threshold voltage (Vth) of the driving transistor DT.

The first scan signal SC1(n), the third scan signal SC3(n), and the emission control signal EM(n) have high voltages, and the second scan signal SC2(n) and the fourth scan signal SC4(n) have low voltages. Accordingly, the third to seventh transistors T3 to T7 are turned off, the first transistor T1 remains on, and the second transistor T2 is turned on. In other words, the second transistor T2 is turned on, so the data voltage Vdata is applied to the driving transistor DT, and the first transistor T1 forms a diode connection between the first node N1 and the third node N3, so the threshold voltage (Vth) of the driving transistor DT can be sampled.

The emission period Ton may be a period when the sampled threshold voltage (Vth) is offset and the light emitting diode OD emits light with the driving current (Id) corresponding to the sampled data voltage Vdata.

The emission control signal EM(n) has a low voltage, and the third and fourth transistors T3 and T4 are turned on.

As the third transistor T3 is turned on, the high-potential driving voltage EVDD supplied to the fourth node N4 is applied to the first electrode of the driving transistor DT connected to the second node N2 through the third transistor T3. The driving current (Id) supplied from the driving transistor DT to the light emitting diode OD via the fourth transistor T4 becomes independent of the value of the threshold voltage (Vth) of the driving transistor DT, so that the threshold voltage (Vth) of the driving transistor DT is compensated and operates.

Figure 5:
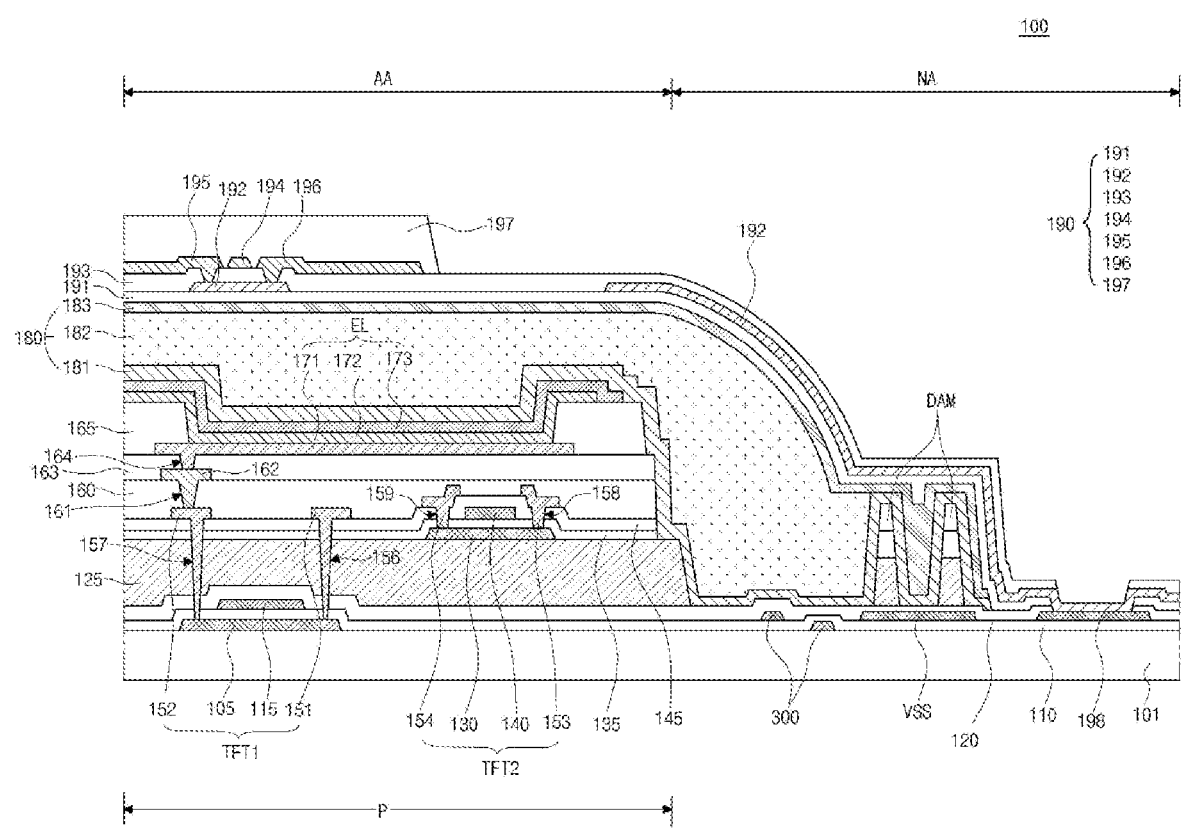
FIG. 5 is a cross-sectional view schematically illustrating an example of a cross-sectional structure of a display panel according to an embodiment of the present disclosure.

Hereinafter, an example of a cross-sectional structure of the display panel 100 of this embodiment is described with further reference to FIG. 5. FIG. 5 is a cross-sectional view schematically illustrating an example of a cross-sectional structure of a display panel according to an embodiment of the present disclosure.

In FIG. 5, for convenience of explanation, two thin film transistors TFT1 and TFT2 are shown in the pixel P in the display region AA. Here, the thin film transistor TFT1 located relatively lower and close to the substrate 101 is referred to as a first thin film transistor TFT1, which may be a polycrystalline silicon thin film transistor. The thin film transistor TFT2 located relatively upper and far from the substrate 101 is referred to as a second thin film transistor TFT2, which may be an oxide thin film transistor.

Meanwhile, in this embodiment, a case where the first thin film transistor TFT1 is a driving transistor (DT of FIG. 2) is taken as an example. Further, a case where the second thin film transistor TFT2 is one of the first to seventh transistors (T1 to T7 of FIG. 2) that are switching thin film transistors, more specifically, a transistor connected to the capacitor Cst is taken as an example. For convenience of explanation, the first thin film transistor TFT1 is shown as connected to the light emitting diode OD.

The substrate 101 may be formed of, for example, a thin glass substrate (or glass film) or a plastic substrate (or plastic film) to implement a flexible characteristics of the display panel 100.

Here, when the substrate 101 is formed of a glass substrate, for example, the substrate 101 may have a thickness of about 0.2 mm.

Meanwhile, when the substrate 101 is formed of a plastic substrate, for example, the substrate 101 may include at least one polyimide layer.

The first thin film transistor TFT1 may include a first semiconductor layer 105 disposed on the substrate 101, a first gate electrode 115 that overlaps the semiconductor layer 105 with a first insulating layer 110 interposed therebetween, and a first source electrode 151 and a first drain electrode 152 located on a fourth insulating layer 145 over the first gate electrode 115. Here, the first semiconductor layer 105 may be formed of polycrystalline silicon, but not limited thereto.

The first semiconductor layer 105 may include a central channel region and source and drain regions on both sides. The first source electrode 151 and the first drain electrode 152 may be connected to the source region and the drain region of the first semiconductor layer 105 through first and second contact holes 156 and 157 that are formed in the insulating layers 110, 120, 125, 135, and 145 located below the first source and drain electrodes 151 and 152.

A second insulating layer 120 may be formed on the first gate electrode 115 of the first thin film transistor TFT1.

A first interlayered insulating layer 125 may be formed on the second insulating layer 120. The second thin film transistor TFT2 may be formed on the first interlayered insulating layer 125.

The second thin film transistor TFT2 may include a second semiconductor layer 130 on the first interlayered insulating layer 125, a second gate electrode 140 that overlaps the second semiconductor layer 130 with a third insulating layer 135 interposed therebetween, and a second source electrode 153 and a second drain electrode 154 located on the fourth insulating layer 145 over the second gate electrode 140. Here, the second semiconductor layer 130 may be formed of an oxide semiconductor, but not limited thereto.

The second semiconductor layer 130 may include a central channel region and source and drain regions on both sides. The second source electrode 153 and the second drain electrode 154 may be connected to the source region and the drain region of the second semiconductor layer 130 through third and fourth contact holes 158 and 159 formed in the insulating layers 135 and 145 located below the second source and drain electrodes 153 and 154.

A second interlayered insulating layer (or first planarization layer) 160 may be formed on the second thin film transistor TFT2.

Here, the first, second, third, and fourth insulating layers 110, 120, 135, and 145 may be made of an inorganic insulating material such as silicon nitride or silicon oxide, but not limited thereto.

In addition, the first and second interlayered insulating layers 125 and 160 may be made of an organic insulating material such as photo acrylic or benzocyclobutene, but not limited thereto.

A connection electrode 162 may be formed on the second interlayered insulating layer 160. The connection electrode 162 may be connected to the first drain electrode 152 through a contact hole 161 formed in the second interlayered insulating layer 160.

A third interlayered insulating layer (or second planarization layer) 163 may be formed on the connection electrode 162. The third interlayered insulating layer 163 may be made of an organic insulating material such as photo acrylic or benzocyclobutene, but not limited thereto.

The light emitting diode OD and a bank layer 165 may be formed on the third interlayered insulating layer 163.

The light emitting diode OD may include an anode electrode (or first electrode) 171, a light emitting layer 172, and a cathode electrode (or second electrode) 173.

The anode electrode 171 may be connected to the connection electrode 162 through the contact hole 164 formed in the third interlayered insulating layer 163.

The bank layer 165 may be disposed along a boundary of the pixel P and may be formed to cover an edge of the anode electrode 171. The light emitting layer 172 may be formed on the anode electrode 171 exposed through an opening of the bank layer 165.

The cathode electrode 173 may be formed on the light emitting layer 172 and may be applied with the low-potential driving voltage (EVSS of FIGS. 1 and 3).

An encapsulation layer 180 may be formed on the cathode electrode 173. The encapsulation layer 180 may include at least one inorganic encapsulation layer and at least one organic encapsulation layer, but not limited thereto. In the present disclosure, a structure of the encapsulation layer 180, in which a first encapsulation layer 181, a second encapsulation layer 182, and a third encapsulation layer 183 are sequentially stacked, is described as an example.

The first encapsulation layer 181 may be formed on the substrate 101 on which the cathode electrode 173 is formed. The third encapsulation layer 183 may be formed on the substrate 101 on which the second encapsulation layer 182 is formed, and may be configured to surround top, bottom, and side surfaces of the second encapsulation layer 182 together with the first encapsulation layer 181. The first encapsulation layer 181 and the third encapsulation layer 183 can minimize or prevent external moisture or oxygen from penetrating into the light emitting diode OD. The first encapsulation layer 181 and the third encapsulation layer 183 may be formed of an inorganic insulating material capable of low-temperature deposition, such as silicon nitride, silicon oxide, silicon oxynitride, or aluminum oxide.

The second encapsulation layer 182 may serve as a buffer to relieve stress between layers due to bending of the display device (10 of FIG. 1), and may flatten steps between layers. The second encapsulation layer 182 may be formed on the substrate 101 on which the first encapsulation layer 181 is formed, using a non-photosensitive organic insulating material such as acrylic resin, epoxy resin, phenolic resin, polyamide resin, polyimide resin, polyethylene, or silicon oxycarbon (SiOC), or a photosensitive organic insulating material such as photo acrylic, but not limited thereto. When the second encapsulation layer 182 is formed through an inkjet method, a dam DAM may be formed in the non-display region NA to prevent the second encapsulation layer 182 in liquid form from spreading to an edge of the substrate 101. The dam DAM may be disposed closer to the edge of the substrate 101 than the second encapsulation layer 182. The dam DAM can prevent the second encapsulation layer 182 from spreading into a pad region, where a conductive pad is disposed, on an outermost side of the substrate 101.

The dam DAM is designed to prevent the spreading of the second encapsulation layer 182, but if the second encapsulation layer 182 is formed to exceed a height of the dam DAM during a process, the second encapsulation layer 182 as an organic layer may be exposed to an outside, so moisture, etc., may easily penetrate into the light emitting element. To prevent this, at least 10 or more dams DAMs may be formed.

The dam DAM may be formed simultaneously with the first interlayered insulating layer 125, the second interlayered insulating layer 160, and the third interlayered insulating layer 163. When forming the first interlayered insulating layer 125, a lower layer of the dam DAM may be formed together, and when forming the second and third interlayered insulating layers 160 and 163, an upper layer of the dam DAM is formed together, so that the dam DAM may be formed in a triple laminated structure. As another example, the dam DAM may be formed with one or two of the first, second and third interlayered insulating layers 125, 160 and 163.

Accordingly, the dam DAM may be formed of the same materials as the first interlayered insulating layer 125, the second interlayered insulating layer 160, and the third interlayered insulating layer 163, but not limited thereto.

The dam DAM may be formed to overlap a low-potential driving power line VSS. For example, the low-potential driving power line VSS may be formed at a lower layer of a region, where the dam DAM is located, in the non-display area NA.

The low-potential driving power line VSS and the gate driving portion 300 configured in a gate in panel (GIP) structure may be formed to surround a periphery of the display panel 100, and the low-potential driving power line VSS may be located outside the gate driving portion 300. In addition, the low-potential driving power line VSS may be connected to the cathode electrode 173 to supply the low-potential driving voltage (EVSS of FIG. 3). The gate driving portion 300 is simply shown in the plan and cross-sectional drawings, but may have the same structure as the first and/or second thin film transistor TFT1 and/or TFT2 in the display region AA.

A touch layer 190 may be disposed on the encapsulation layer 180. In the touch layer 190, a touch buffer layer 191 may be located between a touch sensor metal including touch electrode connection lines 192 and 194 and touch electrodes 195 and 196, and the cathode electrode 173 of the light emitting diode OD.

The touch buffer layer 191 may prevent a chemical solution (e.g., developer, etchant, etc.) used during a manufacturing process of the touch sensor metal disposed on the touch buffer layer 191 or moisture from the outside from penetrating into the light emitting layer 172 containing an organic material. Accordingly, the touch buffer layer 191 may prevent damage to the light emitting layer 172 which is vulnerable to the chemical solution or moisture.

According to a mutual-capacitance-based touch sensor structure, the touch electrodes 195 and 196 may be disposed on the touch buffer layer 191, and the touch electrodes 195 and 196 may be disposed to cross each other.

The touch electrode connection lines 192 and 194 may electrically connect the touch electrodes 195 and 196. The touch electrode connection lines 192 and 194 and the touch electrodes 195 and 196 may be located at different layers with a touch insulating layer 193 interposed therebetween.

At least portion of the touch electrode connection lines 192 and 194 may be arranged to overlap the bank layer 165, thereby preventing a decrease in aperture ratio.

Meanwhile, the touch electrodes 195 and 196 may be electrically connected to a touch driving circuit (not shown) through a portion of the touch electrode connection line 192 which extends along the top and side surfaces of the encapsulation layer 180 and the top and side surfaces of the dam DAM and is connected to the touch pad 198.

The portion of the touch electrode connection line 192 may receive a touch driving signal from the touch driving circuit and transmit it to the touch electrodes 195 and 196, and may transmit a touch sensing signal from the touch electrodes 195 and 196 to the touch driving circuit.

A touch protective layer 197 may be disposed on the touch electrodes 195 and 196. In the drawing, the touch protective layer 197 is shown as being disposed on the touch electrodes 195 and 196, but not limited thereto, and the touch protective layer 197 may extend before or after the dam DAM to be disposed on the touch electrode connection line 192.

In addition, a color filter (not shown) may be disposed over the encapsulation layer 180. The color filter may be located on the touch layer 190, or between the encapsulation layer 180 and the touch layer 190.

Hereinafter, strain measurement structure and method of the foldable light emitting display device 10 according to the embodiment of the present disclosure is described in detail.

Figure 6:
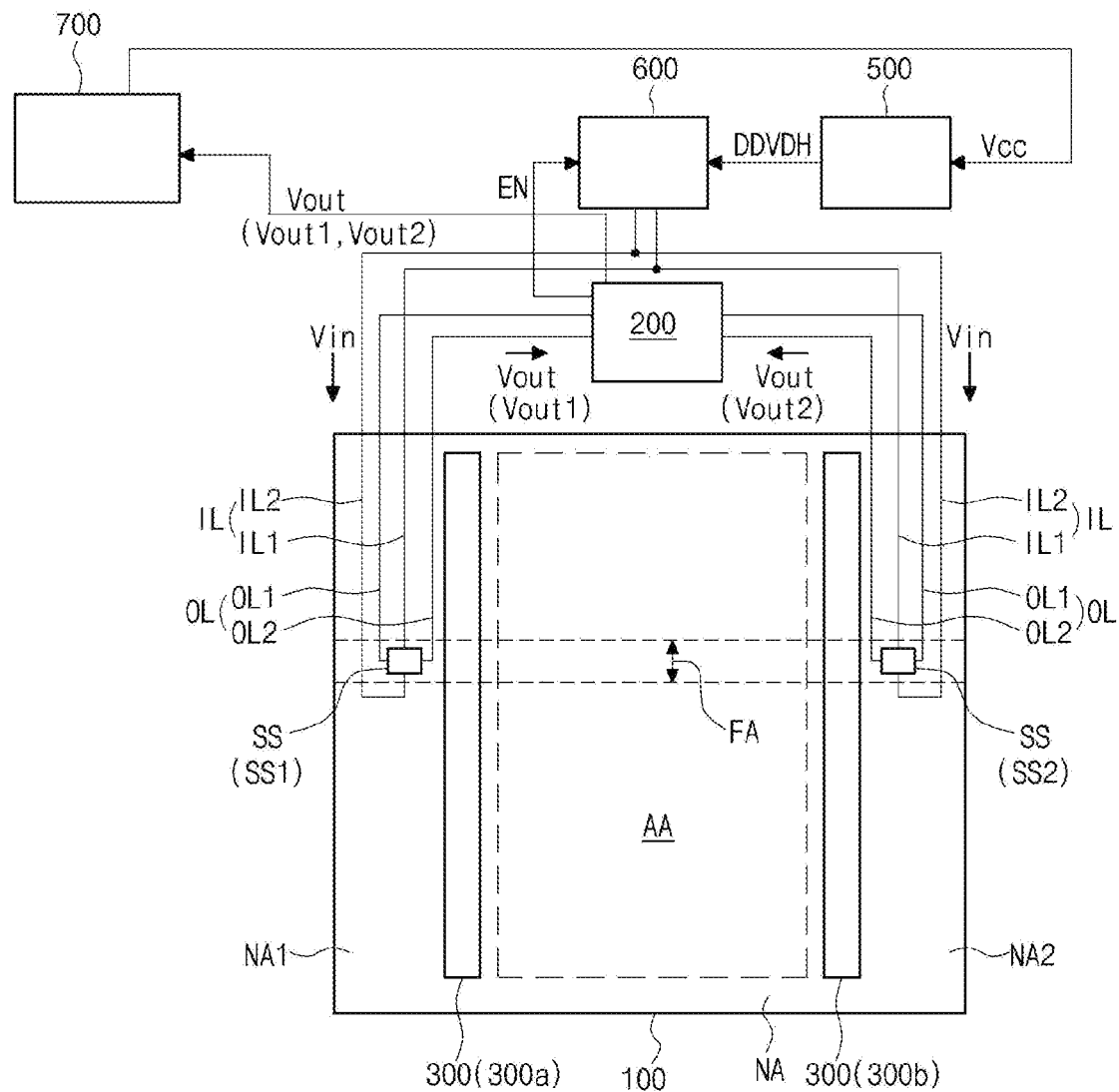
FIG. 6 is a view schematically illustrating components related to a strain measurement according to an embodiment of the present disclosure.
Figure 7:
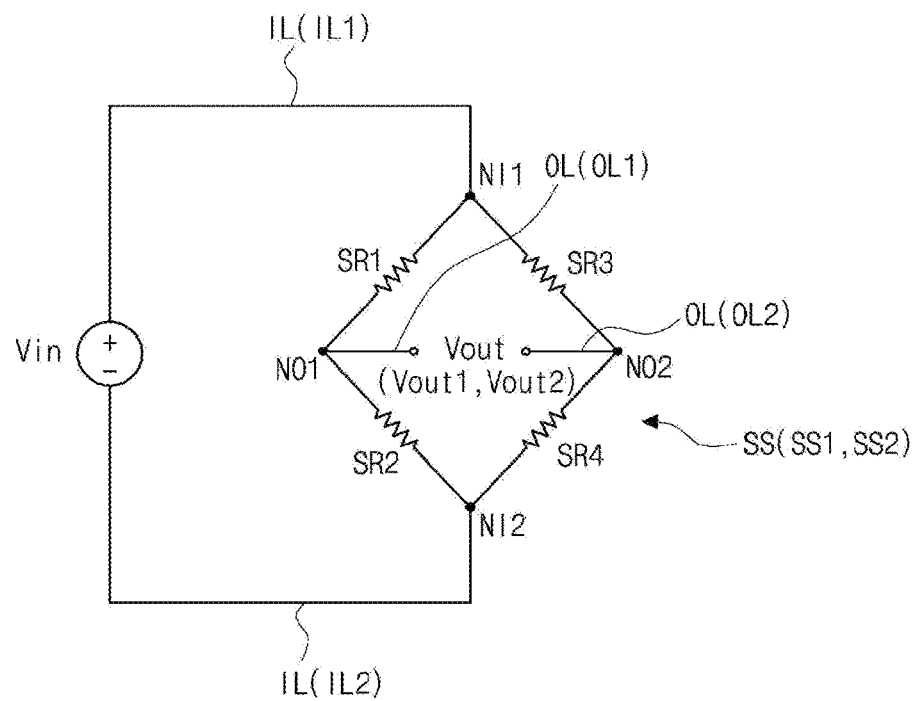
FIG. 7 is a view illustrating a Wheatstone bridge circuit of a strain sensor according to an embodiment of the present disclosure.
Figure 8:
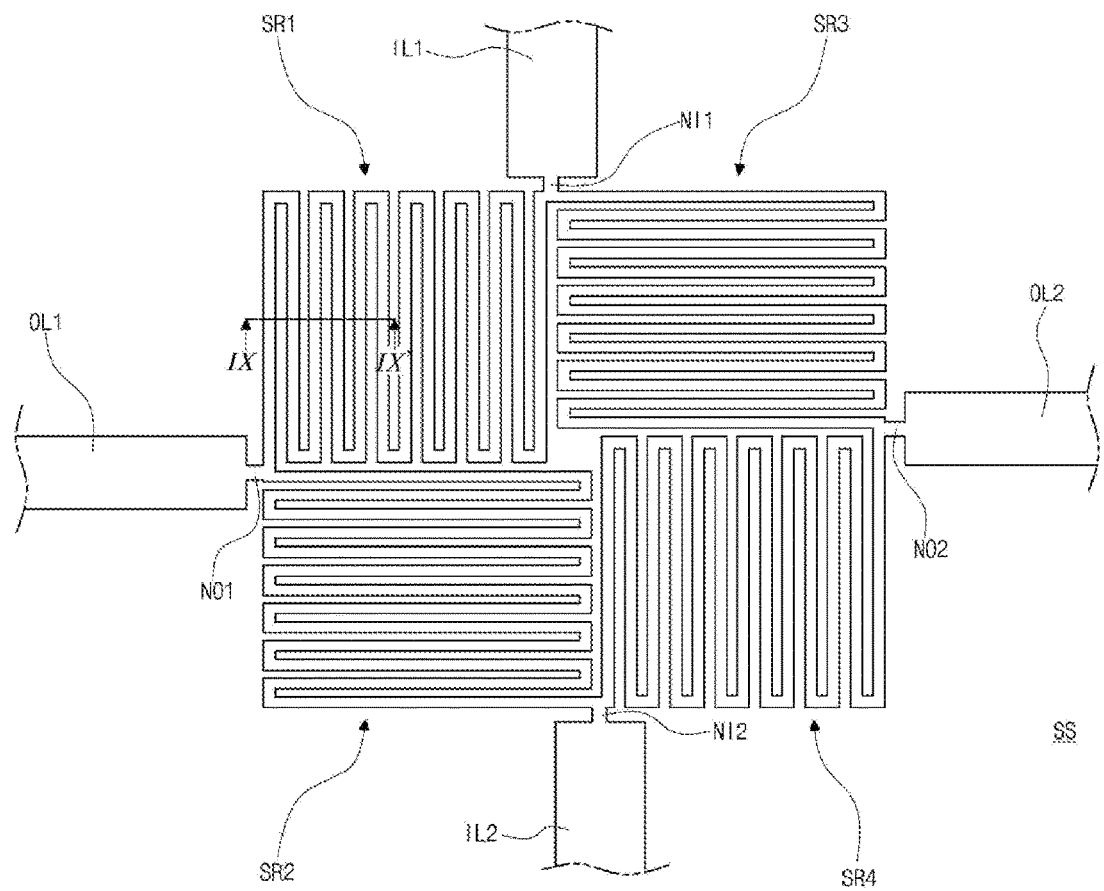
FIG. 8 is a view schematically illustrating an example of a structure of a strain sensor according to an embodiment of the present disclosure.
Figure 9:
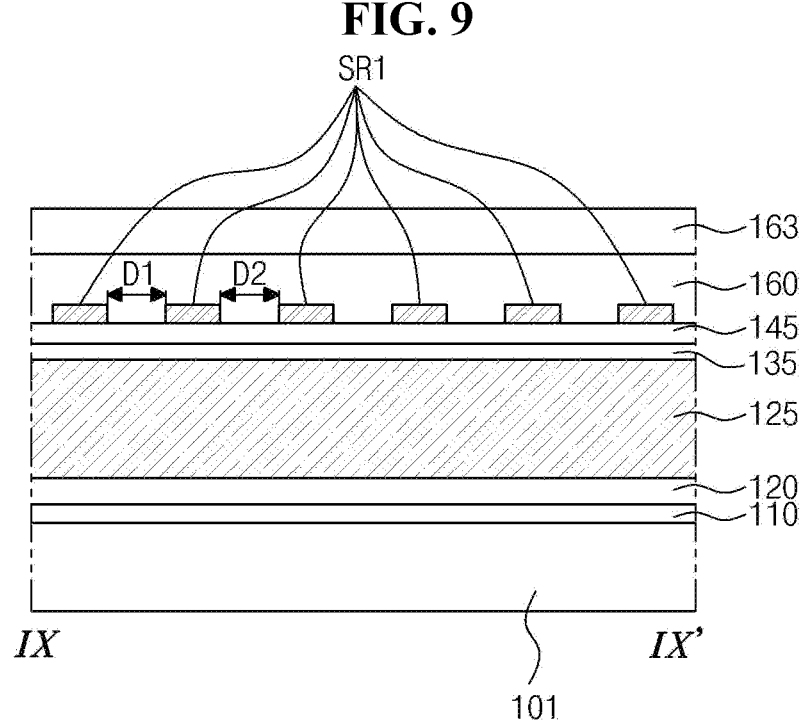
FIG. 9 is a cross-sectional view taken along a line IX-IX' of FIG. 8.

FIG. 6 is a view schematically illustrating components related to a strain measurement according to an embodiment of the present disclosure. FIG. 7 is a view illustrating a Wheatstone bridge circuit of a strain sensor according to an embodiment of the present disclosure. FIG. 8 is a view schematically illustrating an example of a structure of a strain sensor according to an embodiment of the present disclosure. FIG. 9 is a cross-sectional view taken along a line IX-IX' of FIG. 8.

Referring to FIGS. 6 to 9, the display panel 100 is a foldable display panel, and as mentioned above, the folding region FA may be defined approximately along a center of the display region AA. Accordingly, the folding region FA may be located in the center of the display region AA and the center of the first and second non-display regions NA1 and NA2 located on both sides of the display region AA.

The GIP type gate driving portion 300 may be placed in the first and second non-display regions NA1 and NA2. For example, the first gate driving portion 300a may be placed in the first non-display region NA1 and the second gate driving portion 300b may be disposed in the second non-display region NA2.

The strain sensor SS may be provided in portions of the folding region FA located in the first and second non-display regions NA1 and NA2. Here, for convenience of explanation, the strain sensor SS located in the folding region FA of the first non-display region NA1 is referred to as a first strain sensor SS1, and the strain sensor SS located in the folding region FA of the second non-display region NA2 is referred to as a second strain sensor SS2. As shown, the location of the strain sensor SS overlaps with the folding region FA from a plan view. That is, the first strain sensor SS1 located in the first non-display region NA1 overlaps with the folding region FA from a plan view and the second strain sensor SS2 located in the second non-display region NA2 overlaps with the folding region FA from a plan view. As illustrated, the first strain sensor SS1 is spaced apart from the display region AA and the second strain sensor SS2 is spaced apart from the display region AA.

Here, the first and second strain sensors SS1 and SS2 may be, for example, disposed outside the first and second gate driving portions 300a and 300b, respectively, in the first and second non-display regions NA1 and NA2. In other words, the first strain sensor SS1 may be arranged such that it is spaced apart from the first gate driving portion 300a and does not overlap each other from a plan view. Similarly, the second strain sensor SS2 may be arranged such that it is spaced apart from the second gate driving portion 300b and does not overlap each other from a plan view. Moreover, although not specifically shown, the first and second strain sensors SS1 and SS2 may be located outside lines which are located in the first and second non-display regions NA1 and NA2 and transmit driving voltages provided to the gate driving portions 300a and 300b and the display region AA. In this case, an influence of the strain sensor SS on the gate driving portion 300 and the pixel (P of FIG. 1) in the display region AA can be reduced or minimized. As another example, the strain sensors SS1 and SS2 may be disposed between the gate driving portion 300 and the display region AA. That is, in these embodiments, the first strain sensor SS1 may be arranged such that it is spaced apart from the first gate driving portion 300a and the display region AA. Here, the first strain sensor SS1 may not overlap with both the first gate driving portion 300a and the display region AA from a plan view. Similarly, the second strain sensor SS2 may not overlap with both the second gate driving portion 300b and the display region AA from a plan view.

In one embodiment, the strain sensor SS may have a circuit configuration of a Wheatstone bridge structure.

In this regard, referring to FIG. 7, the strain sensor SS may be provided with first to fourth resistance lines SR1 to SR4 which are four resistance elements constituting a Wheatstone bridge circuit. Hereinafter, the first resistance line SR1 may also be referred to as the first resistance element SR1, the second resistance line SR2 may also be referred to as the second resistance element SR2, the third resistance line SR3 may also be referred to as the third resistance element SR3, and the fourth resistance line SR4 may also be referred to as the fourth resistance element SR4.

Here, the first and second resistance lines SR1 and SR2 may be connected in series to each other with a first output node NO1 therebetween. The third and fourth resistance lines SR3 and SR4 may be connected in series to each other with a second output node NO2 therebetween.

In addition, a combination of the first and second resistance lines SR1 and SR2 and a combination of the third and fourth resistance lines SR3 and SR4 may be connected in parallel. In this regard, the first resistance line SR1 and the third resistance line SR3 may be connected in parallel to each other with a first input node NI1 therebetween (namely, the first resistance line SR1 and the third resistance line SR3 shares the first input node NI1 therebetween). The second resistance line SR2 and the fourth resistance line SR4 may be connected in parallel to each other with a second input node NI2 therebetween (namely, the second resistance line SR2 and the fourth resistance line SR4 shares the second input node NI2 therebetween).

Meanwhile, the first to fourth resistance lines SR1 to SR4 may all be formed of the same material and configured to have substantially the same resistance value.

Using the strain sensor SS configured with a Wheatstone bridge circuit structure, the strain, which is a morphological strain of the folding region FA that is the folded portion of the display panel 100, can be obtained.

In this regard, an input voltage Vin may be applied between the first and second input nodes NI1 and NI2. An output voltage Vout may be induced between the first and second output nodes NO1 and NO2.

Here, the input voltage Vin may be generated in the gamma reference voltage portion 600, as mentioned above. The input voltage Vin output from the gamma reference voltage portion 600 may be provided to the strain sensor SS through an input line IL formed on the substrate of the display panel 100.

The input line IL may be, for example, first and second input lines IL1 and IL2 that are electrically connected to a positive (+) terminal and a negative (−) terminal that output the input voltage Vin from the gamma reference voltage portion 600. The first and second input lines IL1 and IL2 may be connected to the first and second input nodes NI1 and NI2, respectively.

Accordingly, the input voltage Vin output from the gamma reference voltage portion 600 may be provided to the strain sensor SS through the input line IL.

When the input voltage Vin is applied, the output voltage Vout may be generated between the first and second output nodes NO1 and NO2.

The output voltage Vout may be transmitted to the controller 200 through an output line OL formed on the substrate of the display panel 100.

The output line OL may include, for example, first and second output lines OL1 and OL2 connected to the first and second output nodes NO1 and NO2, respectively.

Accordingly, the output voltage Vout generated from the strain sensor SS may be provided to the controller 200 through the output line OL.

In one embodiment, the strain of the folding region FA of the display panel 100 may be calculated by the controller 200 using the output voltage Vout detected through the strain sensor SS configured as above.

This is referred to equation (1) below.

$$Vout = (GF/4) * \varepsilon. \qquad \text{Equation (1)}$$

In equation (1), GF is a gauge factor of each resistance line, and $\varepsilon$ is the strain. Here, GF is a ratio of an amount of resistance deformation according to an amount of deformation of the resistance line (or an amount of deformation of a length of the resistance line), which is a unique factor of a material forming the resistance line. Thus, depending on the material forming the resistance line, the gauge factor (GF) can be determined as a constant.

According to equation (1) above, once the output voltage Vout is obtained, the strain ($\varepsilon$) proportional to it can be measured. That is, the controller 200 is configured to retrieve the output voltage Vout and determine the degree of strain (e.g., $\varepsilon$) in the folding region based on the output voltage Vout.

In this regard, for example, when the folding region FA is not deformed, the resistance lines R1 to R4 are also not deformed, so the output voltage Vout becomes 0 and the strain ($\varepsilon$) also becomes 0.

Meanwhile, when the folding region FA is deformed due to continued folding, the resistance lines R1 to R4 may be deformed, and the output voltage Vout may become a value different from 0, reflecting a degree of deformation of the folding region FA. Accordingly, the strain ($\varepsilon$) may have a value corresponding to the output voltage Vout.

In this way, by measuring the output voltage Vout generated from the strain sensor SS located in the folding region FA, the strain ($\varepsilon$), which is a deformation rate of the display panel 100 in the folding region FA, can be calculated.

The structure of the resistance lines SR1 to SR4 forming the strain sensor SS for detecting the output voltage Vout is described with reference to FIGS. 8 and 9.

Referring to FIG. 8, each of the first to fourth resistance lines SR1 to SR4 may be formed in a corrugated (or wrinkled) structure. In other words, each of the first to fourth resistance lines SR1 to SR4 may be formed to have a zigzag structure bent at 180 degrees on both sides. The term "corrugated" is one example shape of a periodic shape that each resistance line of the first to fourth resistance lines SR1 to SR4 can have. In general, it can be said that each resistance line of the first to fourth resistance lines SR1 to SR4 have a periodic shape. In one embodiment shown in FIG. 8, each resistance line has a square-wave like shape seen from a plan view.

Here, the corrugated directions of the resistance lines arranged adjacent to each other may be substantially perpendicular to each other. For example, the first resistance line SR1 may be formed to be corrugated in the horizontal direction, and the second and third resistance lines SR2 and SR3 adjacent to the first resistance line SR1 may be each formed to be corrugated in the vertical direction. The fourth resistance line SR4 adjacent to the second and third resistance lines SR2 and SR3 may be formed to be corrugated in the horizontal direction.

In this way, as the wrinkle directions of the resistance lines SR1 to SR4 constituting the strain sensor SS are configured differently, a difference occurs in resistance value change according to deformation between the resistance lines SR1 to SR4, so the output voltage Vout reflecting the deformation can be generated correctly.

The cross-sectional structure of the resistance lines SR1 to SR4 is described with reference to FIG. 9. In FIG. 9, for convenience of explanation, the cross-sectional structure of the first resistance line SR1 is shown as an example.

The first resistance line SR1 (and the second to fourth resistance lines SR2 to SR4) may be formed of, for example, the same material as and at the same layer as the source electrode 151 or 153 and the drain electrode 152 or 154 of the thin film transistor TFT1 or TFT2 in the pixel P shown in FIG. 5, but not limited thereto. As another example, the first resistance line SR1 (and the second to fourth resistance lines SR2 to SR4) may be formed of the same material as and at the same layer as the first gate electrode 115, the second gate electrode 140, or the connection electrode 162 of the pixel P shown in FIG. 5.

Referring to FIG. 9, a distance D1 between adjacent first resistance line SR1 and a distance D2 between another adjacent first resistance line SR1 may be the same. In some embodiments, however, the distance between adjacent first resistance line SR1 may be different from each other (e.g., D1 and D2 can be different in some embodiments).

Meanwhile, the input line IL and the output line OL may be formed of the same material as and at the same layer as the resistance lines SR1 to SR4 and may be substantially integrated with the resistance lines SR1 to SR4, but not limited thereto. As another example, the input line IL and the output line OL may be formed at a different layer from the resistance lines SR1 to SR4 and be connected to the resistance lines SR1 to SR4 through contact holes.

Meanwhile, in this embodiment, the first and second strain sensors SS1 and SS2 may be formed in the first and second non-display regions NA1 and NA2 facing each other, and accordingly, first and second output voltages Vout1 and Vout2 may be generated from the first and second strain sensors SS1 and SS2, respectively. Here, the first output voltage Vout1 is indicative of a voltage at the first output node NO1 between the first resistance element SR1 and the second resistance element SR2, and the second output voltage Vout2 is indicative of a voltage at a second output node NO2 between the third resistance element SR3 and the fourth resistance element SR4.

As such, the two output voltages Vout1 and Vout2 generated at different locations may be measured. In this case, the first and second output voltages Vout1 and Vout2 may be averaged, and then the strain ($\varepsilon$) corresponding to the average output voltage may be calculated (that is, the degree of strain ($\varepsilon$) may be proportionate to the average the first and second output voltages Vout1 and Vout2). As another example, first and second strains, which are the strains ($\varepsilon$) corresponding to the first and second output voltages Vout1 and Vout2, respectively, may be calculated, and then an average strain may be obtained by averaging the first and second strains.

By measuring the two output voltages Vout1 and Vout2 in this way, the strain of the folding region FA can be detected more accurately. Moreover, when the strains of both sides of the folding region FA are different from each other, the different strains of the both sides can be detected separately.

Meanwhile, the generation of the input voltage Vin input to the strain sensor SS is described below.

Referring to FIG. 6, the power voltage Vcc is provided to the power supply portion 500 to drive (or power on or turn on) the light emitting display device 10 from the host system 700. The power supply portion 500 generates driving voltages to drive the light emitting display device 10 when the power voltage Vcc is applied.

This power supply portion 500 may generate the reference voltage DDVDH which is a driving voltage for generating the gamma reference voltages (GMA of FIG. 10), and provide it to the gamma reference voltage portion 600.

The gamma reference voltage portion 600 may receive the reference voltage DDVDH and use it to generate the gamma reference voltages GMA. Moreover, the gamma reference voltage portion 600 may generate the input voltage Vin using the reference voltage DDVDH.

As such, the gamma reference voltage portion 600 may generate the gamma reference voltages GMA and the input voltage Vin based on the reference voltage DDVDH. Here, the gamma reference voltages GMA and the input voltage Vin may be generated at different timings and may not overlap with each other.

Figure 10:
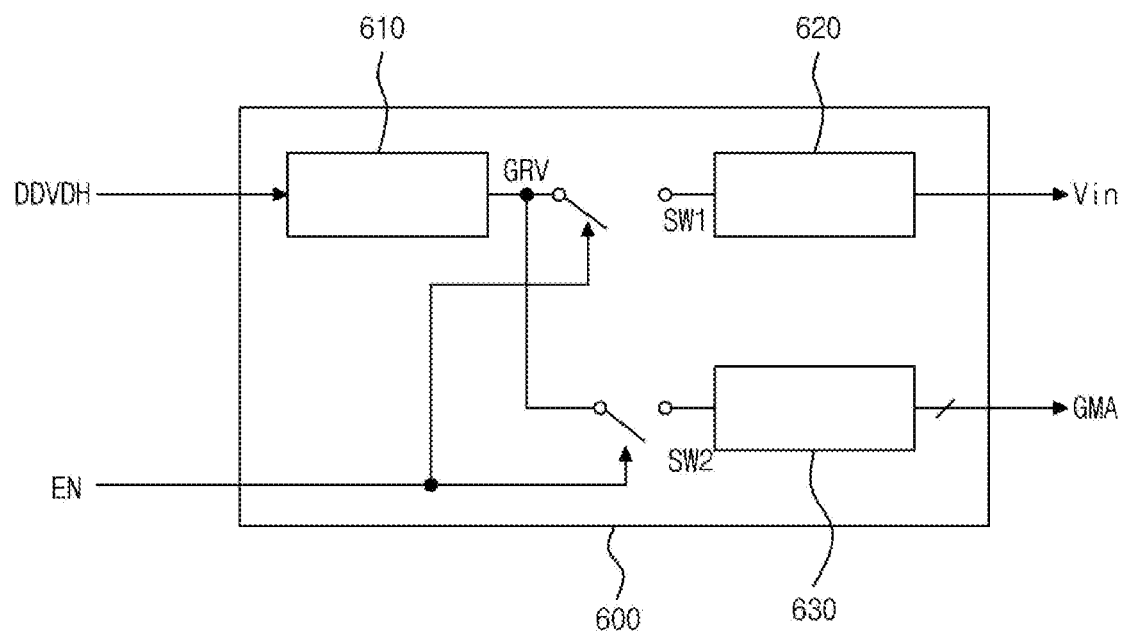
FIG. 10 is a view schematically illustrating a configuration of a gamma reference voltage portion according to an embodiment of the present disclosure.
Figure 11:
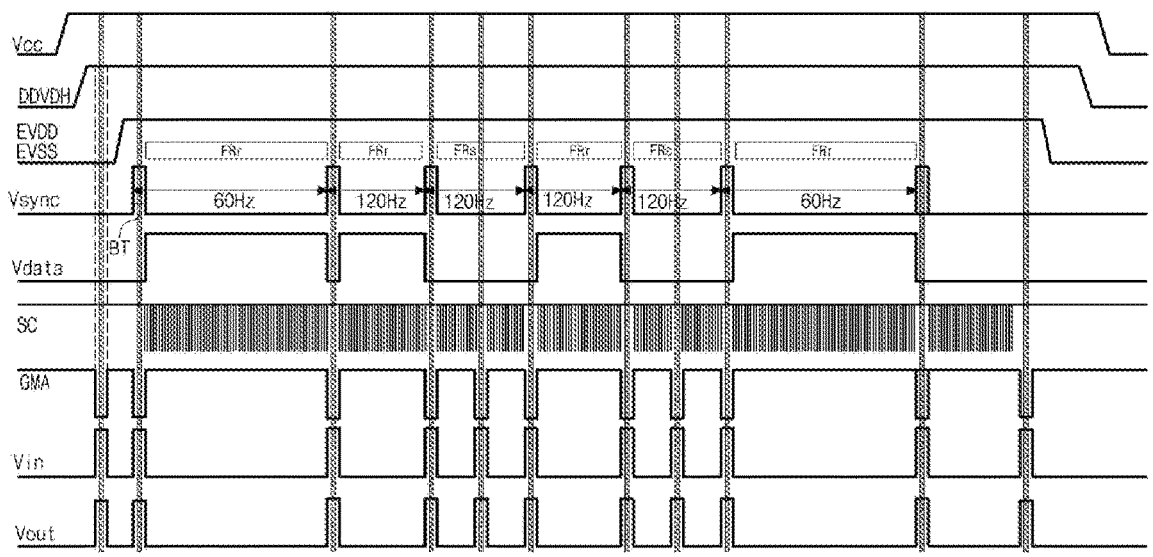
FIG. 11 is a timing diagram schematically illustrating output of gamma reference voltages and an input voltage according to an embodiment of the present disclosure.

This is described with further reference to FIGS. 10 and 11. FIG. 10 is a view schematically illustrating a configuration of a gamma reference voltage portion according to an embodiment of the present disclosure. FIG. 11 is a timing diagram schematically illustrating output of gamma reference voltages and an input voltage according to an embodiment of the present disclosure.

Meanwhile, in FIG. 11, an example is taken where within a driving time (or power-on time) during which the light emitting display device 10 is driven after receiving the power voltage Vcc, a frequency of the light emitting display device 10 is varied between 60 Hz and 120 Hz. In addition, a variable refresh rate operation in which when driving at 120 Hz frequency, there are a refresh frame FRr in which an image is refreshed on the display panel 100, a skip frame FRs in which a previous image is kept without refreshing an image is taken as an example.

Referring to FIG. 10, the gamma reference voltage portion 600 may include, for example, a reference gamma voltage generator 610, an input voltage generator 620, and a gamma reference voltage generator 630.

For example, the reference gamma voltage generator 610 may receive the reference voltage DDVDH and adjust (or lower) its potential to generate a reference gamma voltage GRV. For example, this reference gamma voltage GRV may correspond to a voltage having the highest potential out of the gamma reference voltages GMA.

The reference gamma voltage GRV generated in this way may be selectively provided to the input voltage generator 620 and the gamma reference voltage generator 630 according to a selection signal (or enable signal) EN.

In this regard, for example, referring to FIG. 11, in the refresh frame FRr, since the gamma reference voltages GMA are used to output the data voltages Vdata for image refresh to the display panel 100, the gamma reference voltage generator 630 is selected by the selection signal EN, and the reference gamma voltage GRV may be provided to the gamma reference voltage generator 630.

Meanwhile, in a period in which the image refresh is not performed, for example, in a blank section BT between neighboring frames, in the skip frame FRs, or at a beginning of operation (or a certain time after power-on) or at an end of operation (or a certain time before power-off) which is a power on/off transition period of the light emitting display device 10, there may be no need for the gamma reference voltages GMA to be used. In such the period of non-use of the gamma reference voltages GMA, the input voltage generator 620 is selected by the selection signal EN, and the reference gamma voltage GRV is provided to the input voltage generator 620.

As such, in this embodiment, while the light emitting display device 10 is being operated, the input voltage Vin may be generated for a short period, be repeatedly provided to the strain sensor SS, and the output voltage Vout may be measured. Thus, the strain can be detected, confirmed, and monitored in real time while the light emitting display device 10 is in use.

The input voltage generator 620 may output the input reference gamma voltage GRV as the input voltage Vin, or lower the potential of the reference gamma voltage GRV to output the input voltage Vin. Here, when the input voltage Vin with a potential lower than the reference gamma voltage GRV is used, power consumption for strain detection can be reduced.

In order to selectively provide the reference gamma voltage GRV according to the selection signal EN as above, switches SW1 and SW2 may be used.

In this regard, a first switch SW1 may be connected and switched between the reference gamma voltage generator 610 and the input voltage generator 620, and a second switch SW2 may be connected and switched between the reference gamma voltage generator 610 and the gamma reference voltage generator 630.

The first and second switches SW1 and SW2 may be switched opposite to each other by the selection signal EN. For example, when the selection signal EN is "0," the first switch SW1 is turned on and the second switch SW2 is turned off, and the input voltage generator 620 can be selected accordingly. Conversely, when the selection signal EN is "1," the first switch SW1 is turned off and the second switch SW2 is turned on, and the gamma reference voltage generator 630 can be selected accordingly.

As above, in this embodiment, the input voltage Vin can be generated in the gamma reference voltage portion 600 by utilizing the non-generating section of the gamma reference voltage GMA. Therefore, there is no need to provide a separate power circuit to generate the input voltage Vin, thereby preventing an increase in components and costs of power circuit.

Meanwhile, the output voltage Vout detected through the strain sensor SS and transmitted to the controller 200 as above may be transmitted, for example, to the host system 700, and the strain corresponding to the output voltage Vout may be calculated.

Figure 12:
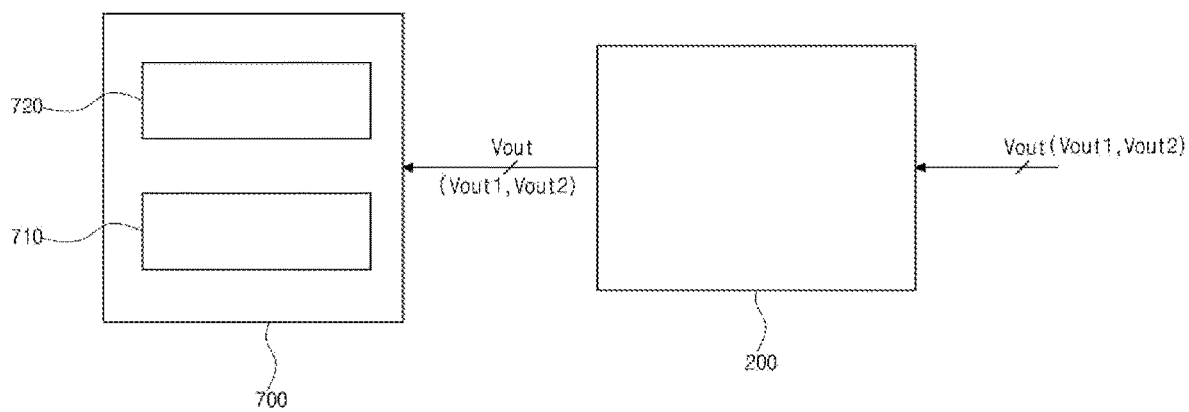
FIG. 12 is a view schematically illustrating transmission of output voltage between a controller and a host system according to an embodiment of the present disclosure.

This is described with further reference to FIG. 12. FIG. 12 is a view schematically illustrating transmission of output voltage between a controller and a host system according to an embodiment of the present disclosure.

Referring to FIG. 12, the host system 700 may include a memory 710 and a processor 720.

The output voltage Vout output from the controller 200 may be stored in the memory 710 of the host system 700. In addition, the output voltage Vout may be provided to the processor 720.

The processor 720 may receive the output voltage Vout, and calculate the strain ($\varepsilon$) corresponding to the output voltage Vout using the above equation (1). The strain ($\varepsilon$) obtained in this way may be stored in the memory 710.

As such, the host system 700 may detect the strain ($\varepsilon$) based on the output voltage Vout measured by the strain sensor SS.

Accordingly, it is possible to determine the shape deformation, i.e., the strain of the folding region FA according to the folding of the display panel 100.

Based on the strain, the host system 700 may provide, for example, the deformation state of the light emitting display device 10 to a user or the like.

In this regard, for example, in the case of a smartphone as an electronic device equipped with the light emitting display device 10 and the host system 700, a menu indicating the deformation state according to the folding of the light emitting display device 10 can be provided, and the user can check the transformation state.

Moreover, the smartphone can provide the deformation state to its manufacturer or telecommunication company, so that if the light emitting display device 10 needs to be replaced, the manufacturer or telecommunication company can notify the user.

As such, by detecting the strain of the folding region FA of the display panel 100, it is possible to determine the occurrence of defects and replacement timing of the foldable light-emitting display device 10.

Meanwhile, the operation of calculating the strain ($\varepsilon$) corresponding to the output voltage Vout may be performed by the controller 200 of the light emitting display device 10.

As described above, in the embodiment of the present disclosure, the strain sensor having a Wheatstone bridge circuit structure can be formed in the folded portion of the non-display region of the display panel, the sensor output voltage can be measured while the light emitting display device is being driven, and the strain, i.e., the deformation rate corresponding to the sensor output voltage can be calculated.

As such, in this embodiment, a new strain measurement structure and method can be provided in which the sensor for strain measurement is embedded in the non-display region of the light emitting display device and the strain is measured based on the sensor output voltage.

Accordingly, the strain can be detected in real time while the light emitting display device is in use, and the strain and its trend due to folding can be continuously checked and monitored. In addition, there is no need to use an existing expensive strain measurement equipment, so costs for strain detection can be reduced or minimized.

In addition, since the sensor input voltage can be generated by utilizing the reference voltage used to drive the light emitting display device, there is no need to add and design a separate power circuit for the strain sensor input voltage, and a separate power sequence for the strain sensor input voltage is not required.

In addition, the strain detection operation can be performed for a short period other than image refresh, so power consumption for strain detection can be reduced or minimized, allowing low-power operation while performing strain detection. Moreover, by performing strain detection in this way, the image quality is substantially not affected by strain detection.

It will be apparent to those skilled in the art that various modifications and variation can be made in the present disclosure without departing from the spirit or scope of the disclosure. Thus, it is intended that the present disclosure cover the modifications and variations of this disclosure provided they come within the scope of the appended claims and their equivalents.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A light emitting display device, comprising:
a display panel including a display region where pixels are arranged, a non-display region outside the display region, and a folding region extending along a direction;
a strain sensor located in the folding region in the non-display region;
a gamma reference voltage circuit providing an input voltage to the strain sensor;
a power supply circuit providing a reference voltage to the gamma reference voltage circuit; and
a controller receiving an output voltage of the strain sensor,
wherein the gamma reference voltage circuit includes:
a reference gamma voltage generator receiving the reference voltage and generating a reference gamma voltage;
an input voltage generator receiving the reference gamma voltage and generating the input voltage; and
a gamma reference voltage generator receiving the reference gamma voltage and generating gamma reference voltages,
wherein the controller provides a selection signal to the gamma reference voltage circuit, and
wherein the gamma reference voltage circuit includes a first switch for switching connection between the reference gamma voltage generator and the input voltage generator, and a second switch for switching connection between the reference gamma voltage generator and the gamma reference voltage generator, based on the selection signal.

2. The light emitting display device of claim 1, wherein the reference gamma voltage is selectively input to the input voltage generator or the gamma reference voltage generator based on the selection signal.

3. The light emitting display device of claim 2, wherein in a refresh frame, the reference gamma voltage is input to the gamma reference voltage generator, and
wherein at a beginning or end of operation of the light emitting display device, or in a blank section or skip frame, the reference gamma voltage is input to the input voltage generator.

4. The light emitting display device of claim 1, wherein the strain sensor includes first and second resistance lines connected in series with each other, a first output node between the first and second resistance lines, third and fourth resistance lines connected in series with each other, and a second output node between the third and fourth resistance lines,
wherein each of the first to fourth resistance lines has a corrugated structure, and
wherein a corrugated direction of the first resistance line is different from those of the second and third resistance lines, and is the same as that of the fourth resistance line.

5. The light emitting display device of claim 1, wherein the folding region is defined in the display region and first and second non-display regions on both sides of the display region along the direction, and
wherein the strain sensor is located in each of the first and second non-display regions.

6. The light emitting display device of claim 1, wherein the controller receives the output voltage and calculates a corresponding strain based on the output voltage.

7. A light emitting display device, comprising:
a display panel including a folding region extending along a direction;
a strain sensor located in a portion of the folding region and having a Wheatstone bridge circuit structure;
a gamma reference voltage circuit receiving a reference voltage and providing an input voltage to the strain sensor; and
a controller receiving an output voltage of the strain sensor,
wherein the gamma reference voltage circuit includes:
a reference gamma voltage generator receiving the reference voltage and generating a reference gamma voltage;
an input voltage generator receiving the reference gamma voltage and generating the input voltage; and
a gamma reference voltage generator receiving the reference gamma voltage and generating gamma reference voltages,
wherein in a refresh frame, the reference gamma voltage is input to the gamma reference voltage generator, and
wherein at a beginning or end of operation of the light emitting display device, or in a blank section or skip frame, the reference gamma voltage is input to the input voltage generator.

8. The light emitting display device of claim 7, wherein the strain sensor is located in a non-display region of the display panel.

9. The light emitting display device of claim 8, wherein the folding region is defined in a display region of the display panel and first and second non-display regions, of the display panel, on both sides of the display region along the direction, and
wherein the strain sensor is located in each of the first and second non-display regions.

10. The light emitting display device of claim 7, wherein the controller provides a selection signal to the gamma reference voltage circuit, and
wherein the reference gamma voltage is selectively input to the input voltage generator or the gamma reference voltage generator according to the selection signal.

11. The light emitting display device of claim 10, wherein the gamma reference voltage circuit includes a first switch for switching connection between the reference gamma voltage generator and the input voltage generator, and a second switch for switching connection between the reference gamma voltage generator and the gamma reference voltage generator, based on the selection signal.

12. The light emitting display device of claim 7, wherein the strain sensor includes first and second resistance lines connected in series with each other across a first output node, and third and fourth resistance lines connected in series with each other across a second output node,
wherein each of the first to fourth resistance lines has a corrugated structure, and
wherein a corrugated direction of the first resistance line is different from those of the second and third resistance lines, and is the same as that of the fourth resistance line.

13. The light emitting display device of claim 7, wherein the controller receives the output voltage and calculates a corresponding strain based on the output voltage.

14. An electronic device, comprising:
a display panel including a display region where pixels are arranged, a non-display region outside the display region, and a folding region extending along a direction;
a strain sensor located in the folding region located in the non-display region;
a gamma reference voltage circuit providing an input voltage to the strain sensor;
a power supply circuit providing a reference voltage to the gamma reference voltage circuit;
a controller receiving an output voltage of the strain sensor; and
a host system receiving the output voltage from the controller and calculating a corresponding strain based on the output voltage received from the controller,
wherein the gamma reference voltage circuit includes:
a reference gamma voltage generator receiving the reference voltage and generating a reference gamma voltage;
an input voltage generator receiving the reference gamma voltage and generating the input voltage; and
a gamma reference voltage generator receiving the reference gamma voltage and generating gamma reference voltages,
wherein the controller provides a selection signal to the gamma reference voltage circuit, and
wherein the gamma reference voltage circuit includes a first switch for switching connection between the reference gamma voltage generator and the input voltage generator, and a second switch for switching connection between the reference gamma voltage generator and the gamma reference voltage generator, based on the selection signal.

15. The electronic device of claim 14, wherein the host system includes:
a memory storing the output voltage; and
a processor calculating the corresponding strain based on the output voltage.

16. A display device, comprising:
a display panel having a display region, a non-display region adjacent to the display region, and a folding region;
a sensor located in the folding region, the sensor spaced apart from the display region and overlapping the non-display region from a plan view;
a gamma reference voltage circuit configured to provide an input voltage to the sensor;
a power supply circuit configured to provide a reference voltage to the gamma reference voltage circuit; and
a controller configured to:
receive an output voltage of the sensor; and
determine a degree of strain in the folding region based on the output voltage of the sensor,
wherein the output voltage includes a first output voltage and a second output voltage,
wherein the first output voltage is indicative of a voltage at a first output node between a first resistance element and a second resistance element of the sensor,
wherein the second output voltage is indicative of a voltage at a second output node between a third resistance element and a fourth resistance element of the sensor,
wherein the output voltage is based on an average of the first output voltage and the second output voltage, and
wherein the degree of strain in the folding region is proportionate to the average of the first output voltage and the second output voltage.

17. The display device of claim 16, wherein the sensor includes a strain sensor, the strain sensor comprising:
the first resistance element;
the second resistance element electrically connected in series with the first resistance element;
the third resistance element sharing a first input node with the first resistance element; and
the fourth resistance element electrically connected in series with the third resistance element,
wherein the second resistance element and the fourth resistance element share a second input node.

18. The display device of claim 17, wherein the input voltage includes a positive terminal and a negative terminal,
wherein the positive terminal of the input voltage is electrically connected to the first input node,
wherein the negative terminal of the input voltage is electrically connected to the second input node.

19. The display device of claim 17, wherein at least one of the resistance element among the first, second, third, and fourth resistance elements includes a periodic shape.

20. The display device of claim 19, wherein the at least one of the resistance element includes a square-wave like shape from a plan view.

21. The display device of claim 16, wherein the gamma reference voltage circuit includes:
a reference gamma voltage generator receiving the reference voltage and generating a reference gamma voltage;
an input voltage generator receiving the reference gamma voltage and generating the input voltage; and
a gamma reference voltage generator receiving the reference gamma voltage and generating gamma reference voltages,
wherein the controller provides a selection signal to the gamma reference voltage circuit,
wherein the reference gamma voltage is selectively input to the input voltage generator or the gamma reference voltage generator based on the selection signal,
wherein in a refresh frame, the reference gamma voltage is input to the gamma reference voltage generator, and
wherein at a beginning or end of operation of the light emitting display device, or in a blank section or skip frame, the reference gamma voltage is input to the input voltage generator.

22. The display device of claim 16, wherein the gamma reference voltage circuit includes:
a reference gamma voltage generator receiving the reference voltage and generating a reference gamma voltage;
an input voltage generator receiving the reference gamma voltage and generating the input voltage; and
a gamma reference voltage generator receiving the reference gamma voltage and generating gamma reference voltages,
wherein the controller provides a selection signal to the gamma reference voltage circuit,
wherein the reference gamma voltage is selectively input to the input voltage generator or the gamma reference voltage generator based on the selection signal, and
wherein the gamma reference voltage circuit includes a first switch for switching connection between the reference gamma voltage generator and the input voltage generator, and a second switch for switching connection between the reference gamma voltage generator and the gamma reference voltage generator, based on the selection signal.

* * * * *